(12) United States Patent
Roustant et al.

(10) Patent No.: US 10,552,464 B2
(45) Date of Patent: Feb. 4, 2020

(54) IDENTIFYING RELEVANT MATERIAL FOR CASES

(71) Applicant: salesforce.com, inc., San Francisco, CA (US)

(72) Inventors: Bruno Roustant, Froges (FR); Marc Brette, Domene (FR); Pierre-Yves Chevalier, Biviers (FR); Francois Lopitaux, San Francisco, CA (US); Ghislain Brun, Meylan (FR); Ilan Ginzburg, St. Pancrasse (FR); Jean-Baptiste Charlety, Grenoble (FR); Pierre Salagnac, Grenoble (FR); Son Thanh Chang, Oakland, CA (US)

(73) Assignee: SALESFORCE.COM, INC., San Francisco, CA (US)

( * ) Notice: Subject to any disclaimer, the term of this patent is extended or adjusted under 35 U.S.C. 154(b) by 617 days.

(21) Appl. No.: 14/575,715

(22) Filed: Dec. 18, 2014

(65) Prior Publication Data

US 2016/0179906 A1 Jun. 23, 2016

(51) Int. Cl.
*G06F 16/00* (2019.01)
*G06F 16/33* (2019.01)

(52) U.S. Cl.
CPC .................. *G06F 16/334* (2019.01)

(58) Field of Classification Search
None
See application file for complete search history.

(56) References Cited

U.S. PATENT DOCUMENTS

| | | | |
|---|---|---|---|
| 5,577,188 | A | 11/1996 | Zhu |
| 5,608,872 | A | 3/1997 | Schwartz et al. |
| 5,649,104 | A | 7/1997 | Carleton et al. |
| 5,715,450 | A | 2/1998 | Ambrose et al. |
| 5,761,419 | A | 6/1998 | Schwartz et al. |
| 5,819,038 | A | 10/1998 | Carleton et al. |
| 5,821,937 | A | 10/1998 | Tonelli et al. |
| 5,831,610 | A | 11/1998 | Tonelli et al. |
| 5,873,096 | A | 2/1999 | Lim et al. |
| 5,918,159 | A | 6/1999 | Fomukong et al. |
| 5,920,859 | A * | 7/1999 | Li .......................... G06F 16/30 715/205 |
| 5,963,953 | A | 10/1999 | Cram et al. |
| 5,983,227 | A | 11/1999 | Nazem et al. |
| 6,092,083 | A | 7/2000 | Brodersen et al. |
| 6,161,149 | A | 12/2000 | Achacoso et al. |
| 6,169,534 | B1 | 1/2001 | Raffel et al. |
| 6,178,425 | B1 | 1/2001 | Brodersen et al. |

(Continued)

*Primary Examiner* — Mark D Featherstone
*Assistant Examiner* — Diedra McQuitery
(74) *Attorney, Agent, or Firm* — Schwabe Williamson & Wyatt

(57) ABSTRACT

A database system may generate a new case associated with a customer support query. The database system may initiate a search for other cases related to the new case and identify articles linked to the related cases. The database system may identify more relevant articles by finding the related cases that use a similar vocabulary for describing similar customer problems. The database system then identifies the articles used for resolving the prior problems. Thus, the database system may bridge the gap between vocabularies used by customers to describe problems and vocabularies used in articles to describe solutions to those problems.

17 Claims, 8 Drawing Sheets

(56) References Cited

U.S. PATENT DOCUMENTS

| | | |
|---|---|---|
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zuckerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 9,374,266 B1 * | 6/2016 | Dellecave, Jr. ... H04L 29/08072 |
| 9,760,607 B1 * | 9/2017 | Tweedy ................ G06F 17/274 |
| 10,185,780 B1 * | 1/2019 | Moody ................. G06F 16/958 |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0249972 A1 | 10/2008 | Dillon |
| 2009/0063415 A1 | 3/2009 | Chatfield et al. |
| 2009/0100342 A1 | 4/2009 | Jakobson |

(56) References Cited

U.S. PATENT DOCUMENTS

| | | | |
|---|---|---|---|
| 2009/0177744 A1 | 7/2009 | Marlow et al. | |
| 2009/0313202 A1* | 12/2009 | Grabarnik | G06F 17/3053 706/50 |
| 2009/0327271 A1* | 12/2009 | Amitay | G06F 17/30675 |
| 2010/0076780 A1* | 3/2010 | Mahesh | G06Q 10/10 705/2 |
| 2011/0185233 A1* | 7/2011 | Belluomini | G06F 11/079 714/37 |
| 2011/0218958 A1 | 9/2011 | Warshavsky et al. | |
| 2011/0247051 A1 | 10/2011 | Bulumulla et al. | |
| 2012/0042218 A1 | 2/2012 | Cinarkaya et al. | |
| 2012/0066218 A1* | 3/2012 | Rapp | G06F 11/0709 707/723 |
| 2012/0087591 A1* | 4/2012 | Chan | G06Q 30/0263 382/218 |
| 2012/0233137 A1 | 9/2012 | Jakobson et al. | |
| 2012/0290407 A1 | 11/2012 | Hubbard et al. | |
| 2013/0212497 A1 | 8/2013 | Zelenko et al. | |
| 2013/0218948 A1 | 8/2013 | Jakobson | |
| 2013/0218949 A1 | 8/2013 | Jakobson | |
| 2013/0218966 A1 | 8/2013 | Jakobson | |
| 2013/0247216 A1 | 9/2013 | Cinarkaya et al. | |
| 2013/0275458 A1* | 10/2013 | Bhatt | G06F 17/30657 707/769 |
| 2014/0358890 A1* | 12/2014 | Chen | G06F 16/3329 707/710 |
| 2014/0359537 A1 | 12/2014 | Jackobson et al. | |
| 2014/0380105 A1* | 12/2014 | Michel | G06F 11/0769 714/57 |
| 2015/0310177 A1* | 10/2015 | Csurka | G06N 5/04 706/50 |
| 2015/0310491 A1* | 10/2015 | Kraft | G06Q 30/0263 705/14.6 |
| 2016/0055188 A1* | 2/2016 | Goel | G06F 17/277 707/741 |

* cited by examiner

FIGURE 5

| | LINKS | CASE 2 | CASE 3 | CASE 4 | RANKING |
|---|---|---|---|---|---|
| ARTICLE 1 (532A) | 1 | SCORE=1 | | | 3 |
| ARTICLE 2 (532B) | 2 | SCORE=1 | SCORE=5 | | 1 |
| ARTICLE 3 (532C) | 1 | | | SCORE=9 | 2 |
|  | 579 | 580 | | 592 | 590 |

| | SIMILARITY SCORE | LAST MODIFIED | # OF VIEWS | LABEL | OVERALL CASE SCORES |
|---|---|---|---|---|---|
| CASE 2 (500B) | SCORE=1 | 1 | 1 | 3 | 6 |
| CASE 3 (500C) | SCORE=5 | 3 | 2 | 1 | 11 |
| CASE 4 (500D) | SCORE=9 | 2 | 1 | 1 | 13 |
|  | 580 | 582 | 584 | 586 | 588 594 |

SERVICE SYSTEM 550

IDENTIFYING RELEVANT MATERIAL FOR CASES

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

One or more implementations relate generally to identifying relevant material for cases.

BACKGROUND

"Cloud computing" services provide shared resources, software, and information to computers and other devices upon request or on demand. Cloud computing typically involves the over-the-Internet provision of dynamically-scalable and often virtualized resources. Technological details can be abstracted from end-users, who no longer have need for expertise in, or control over, the technology infrastructure "in the cloud" that supports them. In cloud computing environments, software applications can be accessible over the Internet rather than installed locally on personal or in-house computer systems. Some of the applications or on-demand services provided to end-users can include the ability for a user to create, view, modify, store and share documents and other files.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

FIG. 5 shows a block diagram for example article ranking scheme accordingly to some implementations.

DETAILED DESCRIPTION

Figure 1A:
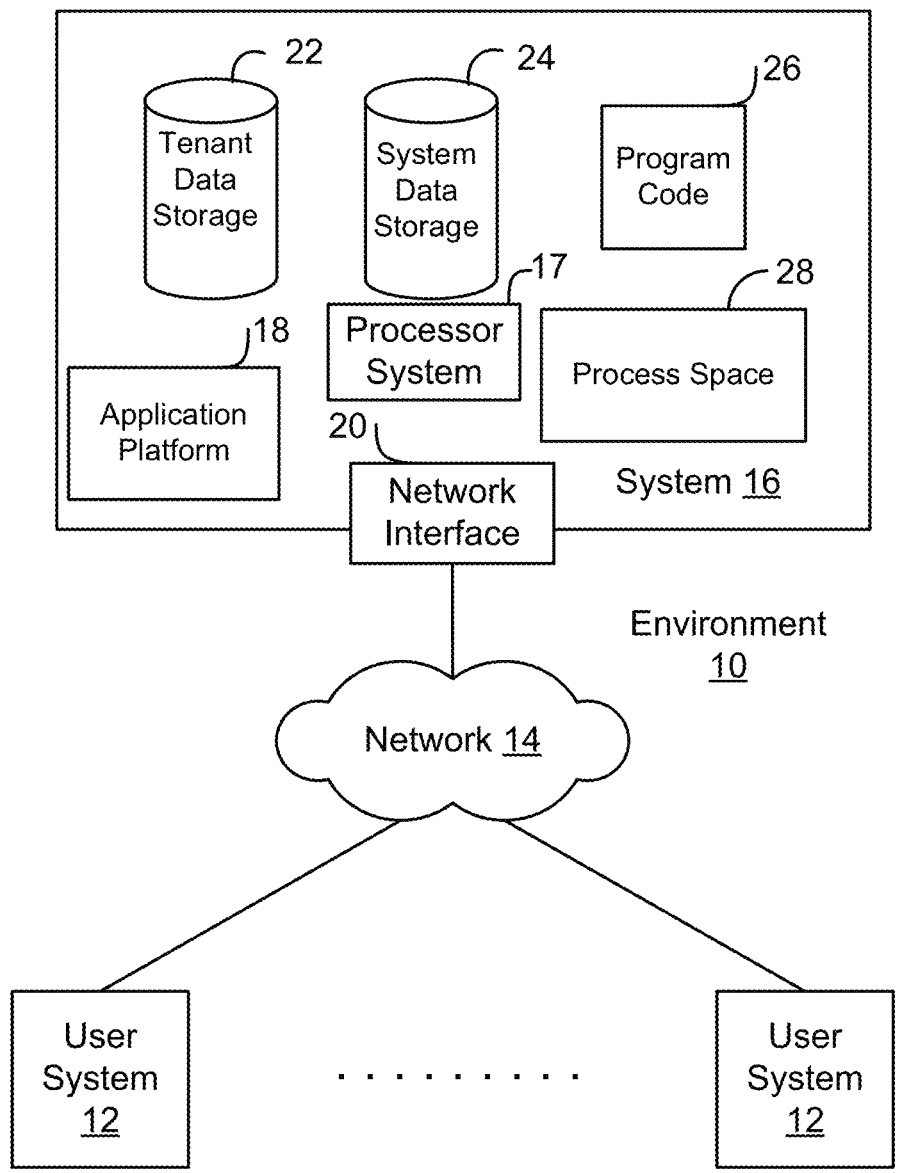
FIG. 1A shows a block diagram of an example environment in which an on-demand database service can be used according to some implementations.

Examples of systems, apparatus, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring the disclosed implementations. Other implementations and applications also are possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

Some implementations described and referenced herein are directed to systems, apparatus, computer-implemented methods and computer-readable storage media for identifying articles helpful in resolving user queries.

A database system might display a case associated with a customer support query. The database system may initiate a search for other cases related to the new case. The database system may extract relevant terms from the title and/or description provided in the new case using a term weighting algorithm, such as more like this (MLT). The relevant terms are then used in a search query for identifying the related cases.

The database system identifies articles linked to the related cases, ranks the articles, and causes the articles to be displayed on a remote user system in an order based on the ranking. The database system may rank the articles based on a number of related cases linked to the articles. The database system also may rank the article based on other parameters, such as relevancy scores for the related cases, labels assigned to the cases, last modified dates of the related cases, etc.

The database system may identify more relevant articles by first finding related cases that use a similar vocabulary to describe similar customer problems. The database system then identifies the articles that were previously determined to help resolve the prior problems. Thus, the database system may bridge the gap between vocabularies used by customers to describe problems and vocabularies used in articles to describe solutions to those problems.

In some implementations, the users described herein are users (or "members") of an interactive online "enterprise social network," also referred to herein as an "enterprise social networking system," an "enterprise collaborative network," or more simply as an "enterprise network." Such online enterprise networks are increasingly becoming a common way to facilitate communication among people, any of whom can be recognized as enterprise users. One example of an online enterprise social network is Chatter®, provided by salesforce.com, inc. of San Francisco, Calif. salesforce.com, inc. is a provider of enterprise social networking services, customer relationship management (CRM) services and other database management services, any of which can be accessed and used in conjunction with the techniques disclosed herein in some implementations. These various services can be provided in a cloud computing environment as described herein, for example, in the context of a multi-tenant database system. Some of the described techniques or processes can be implemented without having to install software locally, that is, on computing devices of users interacting with services available through the cloud. While the disclosed implementations may be described with reference to Chatter® and more generally to enterprise social networking, those of ordinary skill in the art should understand that the disclosed techniques are neither limited to Chatter® nor to any other services and systems provided by salesforce.com, inc. and can be implemented in the context of various other database systems such as cloud-based systems that are not part of a multi-tenant database system or which do not provide enterprise social networking services.

I. EXAMPLE SYSTEM OVERVIEW

FIG. 1A shows a block diagram of an example of an environment 10 in which an on-demand database service can be used in accordance with some implementations. The environment 10 includes user systems 12, a network 14, a database system 16 (also referred to herein as a "cloud-based system"), a processor system 17, an application platform 18, a network interface 20, tenant database 22 for storing tenant data 23, system database 24 for storing system data 25, program code 26 for implementing various functions of the system 16, and process space 28 for executing database system processes and tenant-specific processes, such as running applications as part of an application hosting service. In some other implementations, environment 10 may not have all of these components or systems, or may have other components or systems instead of, or in addition to, those listed above.

In some implementations, the environment 10 is an environment in which an on-demand database service exists. An on-demand database service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system related data, objects, and Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the system 16.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a LAN (local area network), WAN (wide area network), telephone network, wireless network, cellular network, point-to-point network, star network, token ring network, hub network, or other appropriate configuration. The network 14 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 12 can communicate with system 16 using TCP/IP and, at a higher network level, other common Internet protocols to communicate, such as HTTP, FTP, AFS, WAP, etc. In an example where HTTP is used, each user system 12 can include an HTTP client commonly referred to as a "web browser" or simply a "browser" for sending and receiving HTTP signals to and from an HTTP server of the system 16. Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the database system 16. For example, any of user systems 12 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 12 typically executes an HTTP client, for example, a web browsing (or simply "browsing") program, such as a web browser based on the WebKit platform, Microsoft's Internet Explorer browser, Apple's Safari, Google's Chrome, Opera's browser, or Mozilla's Firefox browser, or the like, allowing a user (for example, a subscriber of on-demand services provided by the system 16) of the user system 12 to access, process and view information, pages and applications available to it from the system 16 over the network 14.

Each user system 12 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using a central processing unit (CPU) such as an Intel Pentium® processor or the like. Similarly, the system 16 (and additional instances of an MTS, where more than one is present) and all of its components can be operator-configurable using application(s) including computer code to run using the processor system 17, which may be implemented to include a CPU, which may include an Intel Pentium® processor or the like, or multiple CPUs.

The system 16 includes tangible computer-readable media having non-transitory instructions stored thereon/in that are executable by or used to program a server or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VB Script, and many other programming languages as are well known may be used. (Java™ is a trademark of Sun Microsystems, Inc.).

Figure 1B:
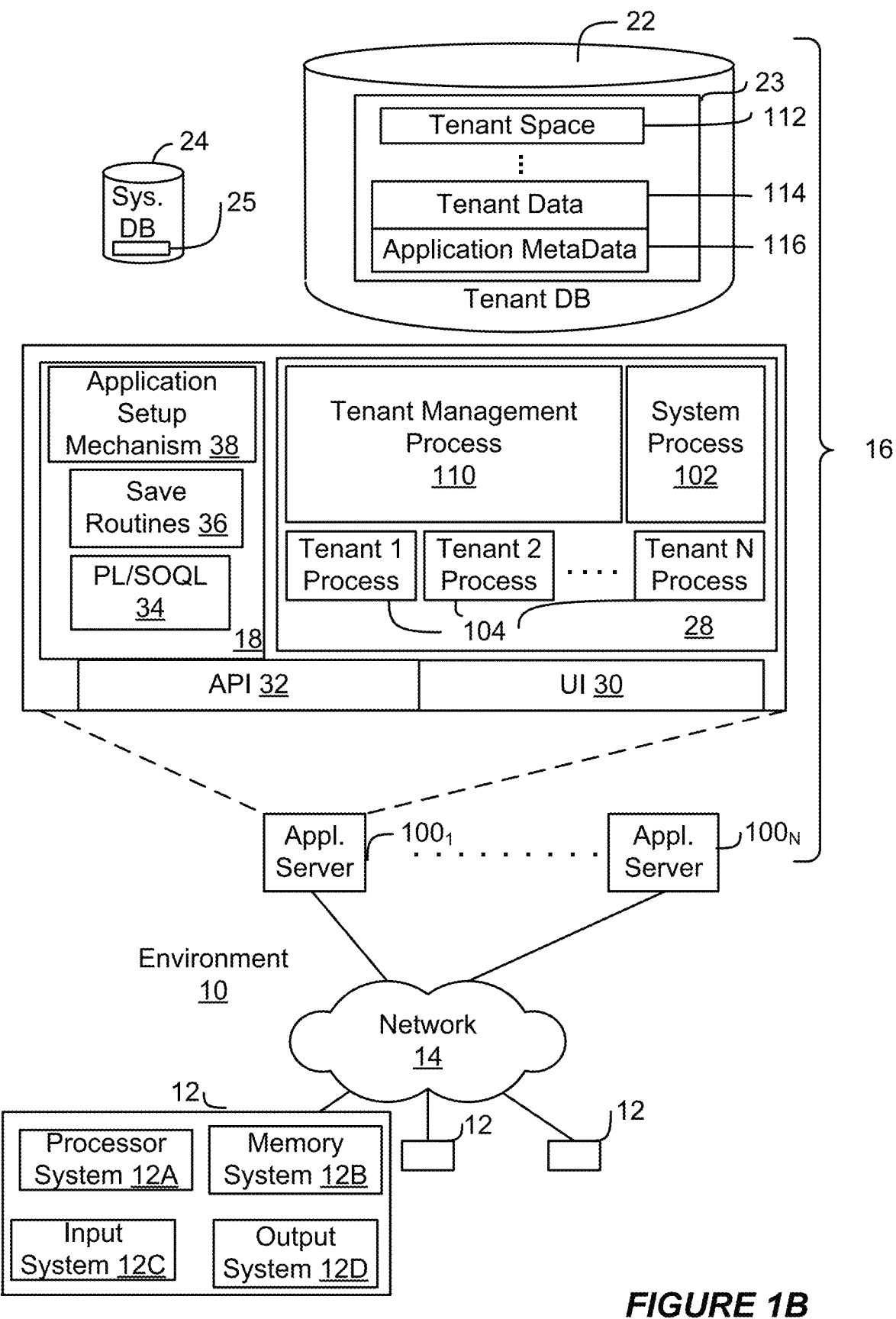
FIG. 1B shows a block diagram of example implementations of elements of FIG. 1A and example interconnections between these elements according to some implementations.

FIG. 1B shows a block diagram of example implementations of elements of FIG. 1A and example interconnections between these elements according to some implementations. That is, FIG. 1B also illustrates environment 10, but FIG. 1B, various elements of the system 16 and various interconnections between such elements are shown with more specificity according to some more specific implementations. Additionally, in FIG. 1B, the user system 12 includes a processor system 12A, a memory system 12B, an input system 12C, and an output system 12D. The processor system 12A can include any suitable combination of one or more processors. The memory system 12B can include any suitable combination of one or more memory devices. The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks.

In FIG. 1B, the network interface 20 is implemented as a set of HTTP application servers $100_1$-$100_N$. Each application server 100, also referred to herein as an "app server", is configured to communicate with tenant database 22 and the tenant data 23 therein, as well as system database 24 and the system data 25 therein, to serve requests received from the user systems 12. The tenant data 23 can be divided into individual tenant storage spaces 112, which can be physically or logically arranged or divided. Within each tenant storage space 112, user storage 114 and application metadata 116 can similarly be allocated for each user. For example, a copy of a user's most recently used (MRU) items can be stored to user storage 114. Similarly, a copy of MRU items for an entire organization that is a tenant can be stored to tenant storage space 112.

The process space 28 includes system process space 102, individual tenant process spaces 104 and a tenant management process space 110. The application platform 18 includes an application setup mechanism 38 that supports application developers' creation and management of applications. Such applications and others can be saved as metadata into tenant database 22 by save routines 36 for execution by subscribers as one or more tenant process spaces 104 managed by tenant management process 110, for example. Invocations to such applications can be coded using PL/SOQL 34, which provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 116 for the subscriber making the invocation and executing the metadata as an application in a virtual machine.

The system 16 of FIG. 1B also includes a user interface (UI) 30 and an application programming interface (API) 32 to system 16 resident processes to users or developers at user systems 12. In some other implementations, the environment 10 may not have the same elements as those listed above or may have other elements instead of, or in addition to, those listed above.

Each application server 100 can be communicably coupled with tenant database 22 and system database 24, for example, having access to tenant data 23 and system data 25, respectively, via a different network connection. For example, one application server $100_1$ can be coupled via the network 14 (for example, the Internet), another application server $100_{N-1}$ can be coupled via a direct network link, and another application server $100_N$ can be coupled by yet a different network connection. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used.

In some implementations, each application server 100 is configured to handle requests for any user associated with any organization that is a tenant of the system 16. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between the application servers 100 and the user systems 12 to distribute requests to the application servers 100. In one implementation, the load balancer uses a least-connections algorithm to route user requests to the application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and organizations.

In one example storage use case, one tenant can be a company that employs a sales force where each salesperson uses system 16 to manage aspects of their sales. A user can maintain contact data, leads data, customer follow-up data, performance data, goals and progress data, etc., all applicable to that user's personal sales process (for example, in tenant database 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the system 16. Such requests and updates can involve sending one or more queries to tenant database 22 or system database 24. The system 16 (for example, an application server 100 in the system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

II. IDENTIFYING RELEVANT MATERIAL FOR CASES

The database system described above may create cases related to customer queries. For example, a customer may call or email an agent regarding a problem logging into a website or purchasing a product. The agent creates a new case in the database system for tracking and managing the customer problem. The case may include a title and a description of the customer problem. The agent may post information related to the case, such as the case status and details on how the case was resolved.

The agent may initiate a search in the database system for articles related to the customer problem. For example, the database system may search for articles that explain how to log into the website. However, the search engine may identify articles that are not relevant or helpful in resolving the customer problem.

For example, the customer may not adequately explain the problem. For example, the problem may relate to an expired password. However, the customer may not realize the problem is related to an expired password and explain the problem generally as not being able to login to the website. The agent may initiate a search for articles related to login problems. The search engine may identify general articles that relate to login problems but do not provide a specific solution to the expired password problem.

The database system uses a new searching scheme that identifies articles more relevant to customer problems and helps bridge the gap between the terminology used by customers to describe problems and the terminology used in articles for providing solutions to the problems.

Figure 2:
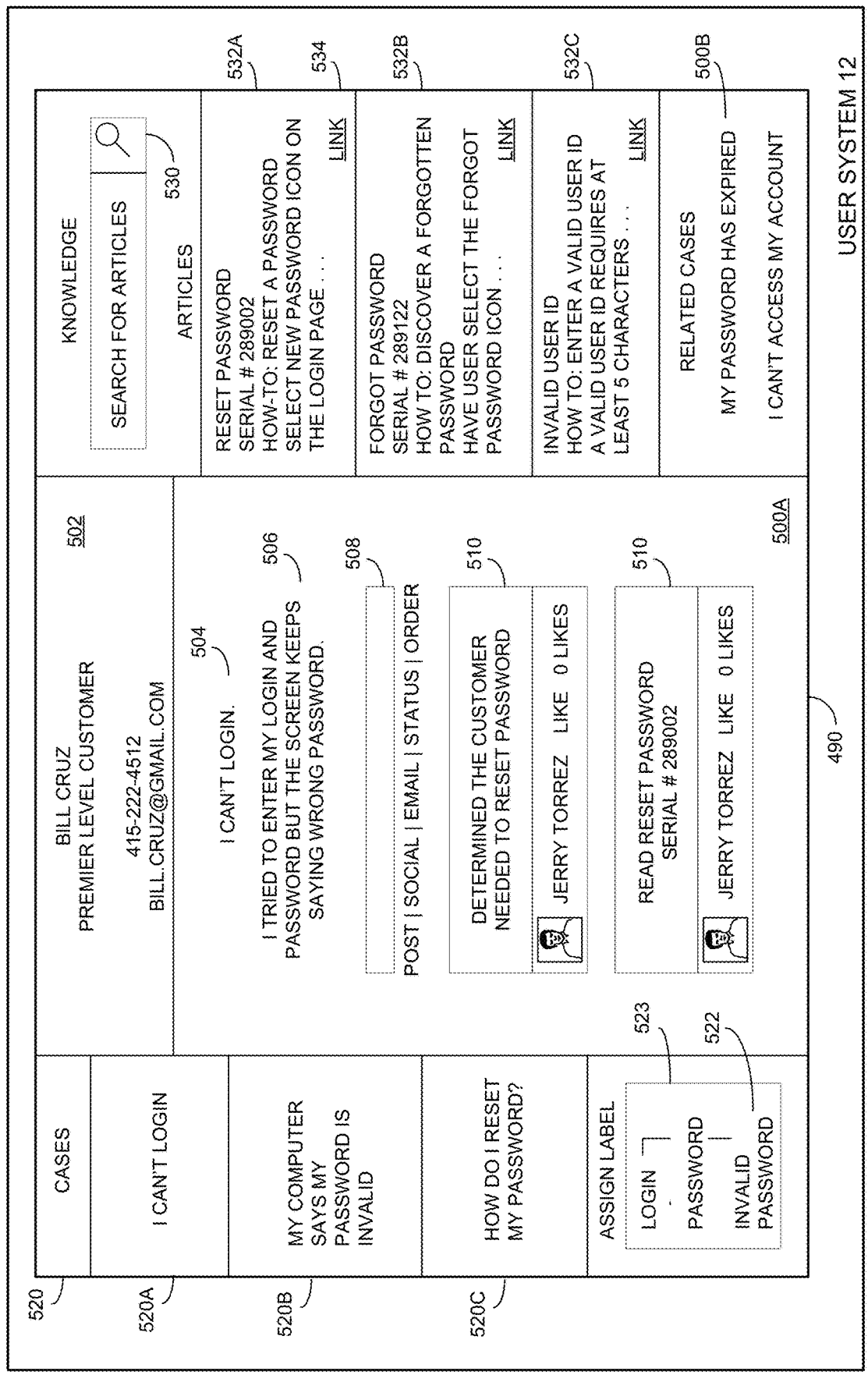
FIG. 2 shows a screen displaying an example case accordingly to some implementations.

FIG. 2 shows a user system displaying an example case according to some implementations. The database system described above may create and display a case 500A on a screen 490 of user system 12. In one example, case 500A may include customer information 502, such as a customer name, status, phone number, and/or email address.

Case 500A also may include a title 504 and a description 506. Title 504 and description 506 may either be generated by the customer experiencing a problem or may be generated by an agent that operates user system 12. For example, the customer may access a website and access a webpage associated with reporting problems. The customer then may enter title 406 and/or description 506 into fields on the webpage. The database system then may generate case 500A in response to the customer submitting the information to the website.

Alternatively, the customer may call, email, text, or otherwise contact the agent operating user system 12. The customer may describe the problem to the agent and the agent may create case 500A in the database system and enter customer information 502, title 504, and description 506.

The agent may post other information in case 500A. For example, the agent may enter data into a field 508 for generating posts 510. Posts 510 may identify events associated with the customer problem, such as further explaining the actions taken for resolving the problem.

In some implementations, case 500A is a record object. A record object is a data structure that can be represented or conceptualized as a "Records Table" that associates records to information about or pertaining to the respective records including, for example, metadata about the records. In some implementations, the Records Table includes all of the records within the organization. In some other implementations, there can be a Records Table for each division, department, team or other sub-organization within an organization. In implementations in which the organization is a tenant of a multi-tenant enterprise social network platform, the Records Table can include all of the records within all of the organizations that are tenants of the multitenant enterprise social network platform. In some implementations, each record can be identified by a record identifier ("RecordID") that is unique at least within the respective organization.

In some implementations posts 510 may be feed items. The term "feed item" (or feed element) refers to an item of information, which can be viewable in a feed. Feed items can include publications such as messages (for example, user-generated textual posts or comments), files (for example, documents, audio data, image data, video data or other data), and "feed-tracked" updates associated with a user, a group or a record (feed-tracked updates are described in greater detail below). A feed item, and a feed in general, can include combinations of messages, files and feed-tracked updates. Documents and other files can be included in, linked with, or attached to a post or comment. For example, posts 510 can include textual statements in combination with a document. The feed items can be organized in chronological order or another suitable or desirable order (which can be customizable by a user) when the associated feed is displayed in a graphical user interface (GUI), for instance, on the user's computing device.

The database system may display other cases 520 currently being handled by the agent. The agent also may assign a label 522 to case 500A. For example, the agent may select a dropdown menu 523 that displays a taxonomy for articles stored in the database system. The taxonomy may organize articles based on different topics, problems, products, models, categories, etc. The agent may select one of the items in the taxonomy as label 522 for case 500A. Label 522 is explained below in more detail.

The agent operating user system 12 may select a search icon 530 to initiate a search for articles 532. In another example, the database system may automatically initiate the search for articles 532 as soon as title 504 and/or description 506 are entered into case 500A. Either way, the database system uses a searching scheme that may identify articles that are more likely to resolve the problem associated with case 500A. For example, one or more of articles 532 may describe how to reset an expired password that is preventing the customer from logging in to the enterprise website.

The database system first may identify cases 500B that are related to new case 500A. For example, the database system may use a term weighting algorithm, such as more like this (MLT), that identifies terms in title 504 and/or description 506 that are most relevant to the meaning of case 500A. Term weighting algorithms are known to those stilled in the art and are therefore not explained in further detail. The database system uses the most relevant terms from title 504, description 506, and/or any other portion of case 500A in a search query for locating related cases 500B. In another example, the database system may use label 522 to identify related cases 500B with similar labels.

The database system then identifies articles 532 that are linked to the related cases 500B. For example, the search engine may identify a related case 500B that uses some of the same relevant terms contained in title 504 and/or description 506. Article 532A may have provided a solution to the problem associated with related case 500B. An agent may have linked article 532A to case 500B prior to closing case 500B. For example, the agent may have selected an icon similar to icon 534 that creates a link or pointer between case 500B and article 532A.

The link between case 500B and article 532A indicates article 532A was helpful in resolving the issue associated with related case 500B. Since case 500B is related to case 500A, article 532A also may provide a solution to the problem associated with case 500A. Thus, database system identifies articles 532 that have been previously identified by customers or agents (linked) as resolving similar problem.

The database system uses the links to locate articles 532 that may resolve customer problems even when title 504 and description 506 of case 500A use different terms than articles 532. In other words, the vocabulary used by the customer or agent to describe the problem may be different from the vocabulary used in articles 532 for describing the solution to the same problem. The database system by locating related cases and then using the articles linked to those cases bridges the gap between customer vocabularies and article vocabularies.

The database system may identify multiple related cases 500 and multiple linked articles 532. The database system may rank articles 532 based on a variety of factors, such as the number of related cases linking to the article, how closely cases 536 relate to new case 500A, etc. The database system then may list articles 532 in an order based on the ranking. For example, the database system may list the highest ranked article 532A first, a next highest ranked article 534B second, etc.

Figure 3:
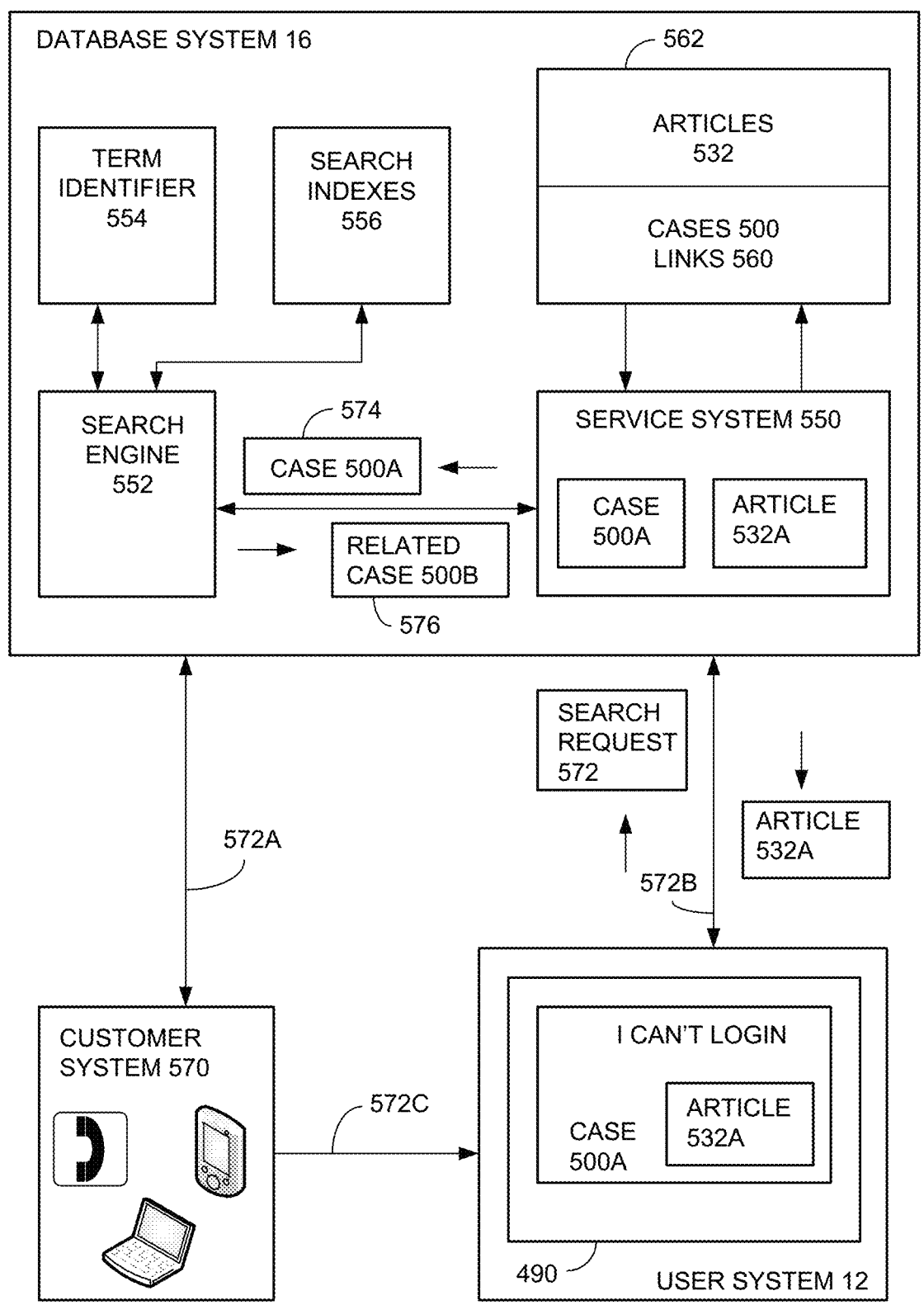
FIG. 3 shows a block diagram for an example database system operating a service system accordingly to some implementations.

FIG. 3 shows a block diagram for an example database system for identifying articles accordingly to some implementations. A customer system 570 may comprise any device capable of communicating with a user system 12 and/or communicating with database system 16. For example, customer system 570 may include a personal computer, laptop computer, landline phone, cell phone, smart phone, notebook, or the like, or any other communication or computing device.

User system 12 and database system 16 may comprise any of the devices described above in FIGS. 1-2. Customer system 570 and/or user system 12 may communicate with database system 16 over connections 572A and 572B, respectively, such as via network 14 as also described above in FIGS. 1-2. Customer system 570 may communicate with user system 12 over a connection 572C, such as a connection over network 14 or over a phone or other telecommunication network connection.

In one example, database system 16 operates a service system 550, also referred to as a service cloud. Service system 550 accesses a database 562 that contains different cases 500 and articles 532. Cases 500 and articles 532 may comprise objects, records, data structures, files, documents, or other data item for storing any of the information described above in FIG. 2. The enterprise operating service system 550 may have written at least some of articles 532 to resolve problems with specific products and services sold by the enterprise.

Cases 500 also may include links 560 that link to associated articles 532. As explained above, the agent operating user system 12 or the user operating customer system 570 may create links 560 to articles 532 that resolved the issue for associated cases 500. Links 560 may comprise any address, pointer, or any other identifier for locating articles 532. For example, links 560 may comprise universal resource locators (URLs) that identify different files or objects in database 562.

Database system 16 includes a search engine 552 that generates and accesses search indexes 556 that may include some of articles 532 and cases 500. Search engine 552 and indexes 556 are known to those skilled in the art and are therefore not described in detail.

Search engine 552 may use a term identifier 554 to extract relevant terms from cases 500. For example, term identifier 554 may identify sentence structures, term frequencies, and other sentence characteristics to determine which terms are most likely to identify the subject or context of cases 500. In one example, term identifier 554 uses a more like this (MLT) algorithm. Of course other term weighting or natural language processing algorithms can also be used for identifying relevant terms in cases 500.

A customer, user, client, or any other person operating customer system 570 contacts database system 16 or user system 12 regarding an inquiry, problem, question, issue, or any other support related matter. As mentioned above, a new case 500A is created in response to the query from customer system 570.

For example, the user of customer system 570 may call the agent operating user system 12 via connection 572C. The agent may create new case 500A in service system 500 via connection 572B that identifies the problem identified by the user over phone connection 572C.

Alternatively, database system 16 may automatically create case 500A in response to inputs supplied directly by customer system 570. For example, the user operating customer system 570 may log into the website operated by service system 550 via connection 572A and enter information into fields of a webpage identifying the problem with a product or service. In response to the customer inputs, service system 550 may generate new case 500A.

The user on customer system 570, or the agent on user system 12, may send a search request 572 to database system 16 for articles related to the problem associated with case 500A. In another example, service system 16 may automatically initiate the search after creating case 500A. As discussed above, in one example, case 500A is associated with a customer problem logging into a website operated by database system 16.

Service system 550 initiates a search with search engine 552 for other cases 500 related to new case 500A. For example, service system 550 may submit data 574 from case 500A to search engine 552. Search engine 552 may use term identifier 554 to extract relevant terms from data 574. Search engine 552 uses the identified terms to search for related cases 500 in search indexes 556. Search engine 552 identifies and sends related case 500B, or a name 576 of related case 500B, back to service system 550. For example, case 500B is related to the same login problem associated with new case 500A.

Service system 550 accesses the related case 500B in database 562 and identifies the associated link 560. Service system 550 then locates one or more articles 532A identified by the link 560. For example, agents or users may have previously used article 532A to resolve case 500B and then created a link 560 in case 500B to article 532A.

Service system 550 may display article 532A in case 500A. The user operating customer system 570, or the agent operating user system 12, then may read article 532A and hopefully resolve the problem associated with case 500A.

Figure 4:
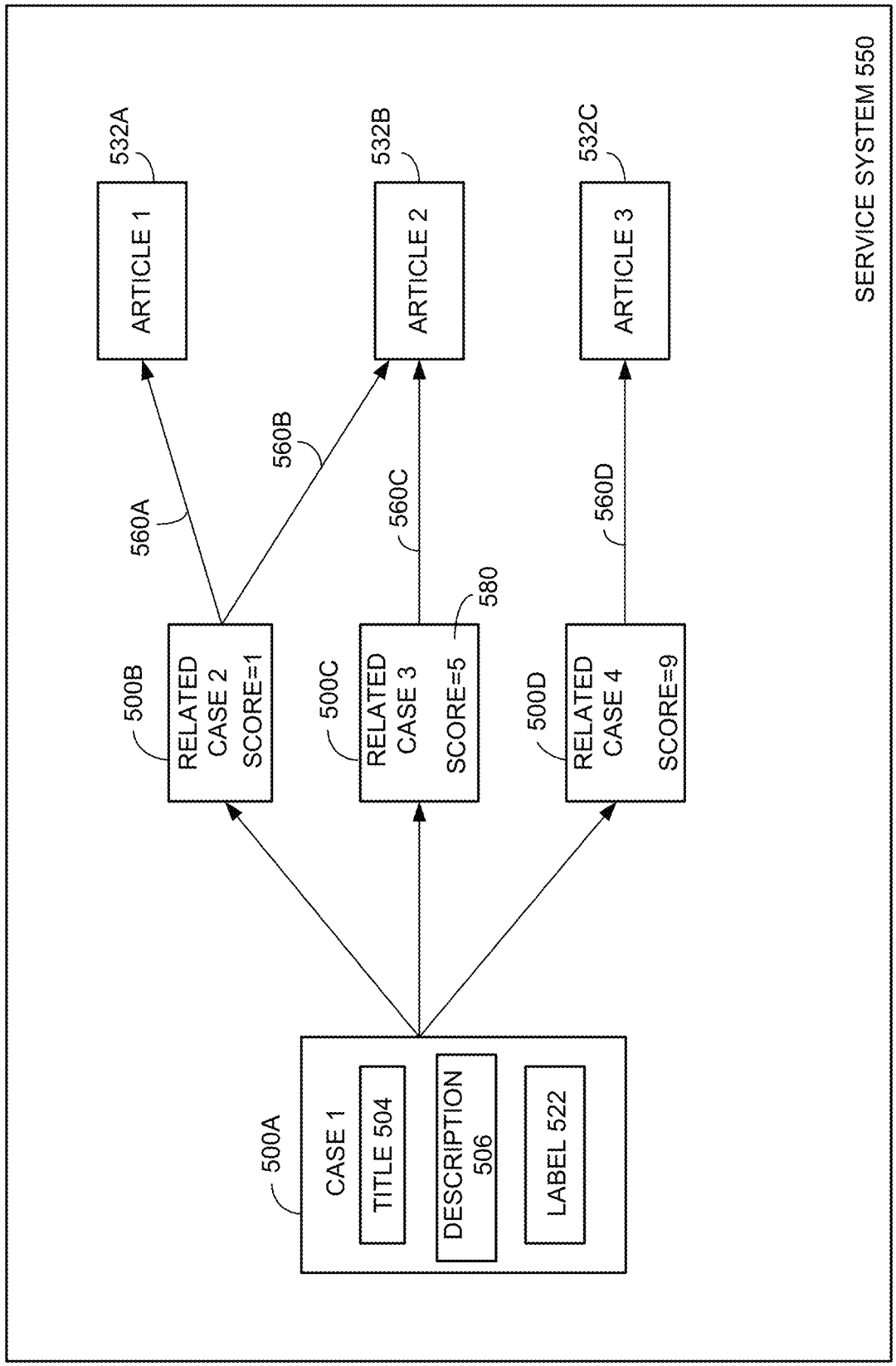
FIG. 4 shows a block diagram for an example article search process accordingly to some implementations.

FIG. 4 shows a block diagram for an example search process according to some implementations. Service system 550 creates a case 500A for a customer problem as explained above. Service system 550 may use any portion of case 500A for searching for related cases. In one example, service system 550 compares terms from title 504 and description 506 with terms in other cases 500. In another example, search system 550 also may use label 522 assigned to case 500A in the search.

In this example, service system 550 identified three cases 500B, 500C, and 500D as related to case 500A. Service system 550 may assign related cases 500B, 500C, and 500C similarity scores 580 indicating a level of similarity with case 500A. For example, the service system 550 may assign cases 500B, 500C, and 500C similarity scores of 1, 5, and 9, respectively. As explained above, known search engine and term identifier algorithms may weight terms in documents, compare the terms with terms in other documents, and generate similarity scores 580 based on the number of matching terms.

Service system 550 identifies links 560 associated with related cases 500B-550D. For example, case 500B may include two links 560A and 560B to articles 532A and 532B, respectively. Case 500C may only include one link 560C to article 532B and case 500D may include one link to article 532C.

FIG. 5 shows a block diagram for an example process for ranking articles accordingly to some implementations. A first table 592 shows one example ranking scheme used by service system 550. Of course, service system 550 may use other ranking schemes.

Service system 550 may assign a ranking 590 to articles 532 based on the number of associated links. As shown above in FIG. 4, case 2 is linked to article 1, case 2 and case 3 are linked to article 2, and case 4 is linked to article 3. Service system 550 may rank article 2 with two links higher than articles 1 and 3 with one link.

Service system 550 also may assign rankings 590 to articles 532 based on similarity scores 580 for associated cases. For example, case 2 was assigned a similarity score of 1, case 3 was assigned a similarity score of 5, and case 4 was assigned a similarity score of 9. Service system 550 may assign higher rankings to articles 532 linked to cases with higher similarity scores 580. For example, service system 550 may assign a higher ranking to article 3 linked to case 4 than articles 1 and 2 linked to cases with lower similarity scores.

Service system 550 may assign different weightings to the number of links 579 and similarity scores 580. In one example, service system 550 may use a higher weighting for the number links associated with articles 532 and use a lower weighting for the similarity scores associated with articles 532. For example, article 2 has two links and articles 1 and 3 each have one link. Service system 550 may rank article 2 higher than articles 1 and 3, regardless, of the associated similarity scores 580.

In this example, service system 550 may use similarity scores 580 to distinguish articles with the same number of links. Article 1 is linked to case 2 and article 3 is linked to case 4. Service system 550 may rank article 3 above article 1 since case 4 has a higher similarity score than case 1.

Thus, service system 550 assigns article 2 a highest ranking, article 3 a next highest ranking, and article 1 the lowest ranking. Service system 550 may display articles 532 based on ranking 590. For example, article 2 is displayed first, article 3 displayed second, and article 1 displayed third.

Table 594 shows other factors that service system 550 may use for generating rankings 590. Service system 550 may identify last modified dates for related cases 500 and assign associated scores 582. For example, service system 550 may assign a higher score 582 to the most recently modified case 500 and assign a lower score 582 for a less recently modified case 500.

Service system 550 also may identify a number of views for cases 500 and assign associated scores 584. For example, service system 550 may assign a higher score 584 to cases with a larger number of times and assign lower scores 584 to cases 500 with a fewer number of views.

In another example, service system 550 may identify labels assigned to cases 500 and assign associated scores 586. For example, the enterprise operating service system 550 may provide a taxonomy of articles 532 associated with different enterprise products, services, or subjects. A user may assign a label from the taxonomy to a case. Service system 550 may generate scores 586 based on an association of the labels in related case and the new case.

For example, a user may select a label for new case 500A (FIG. 4) that is associated with a specific product model, such as cell phone model X. A label for case 2 may be associated with a more generic product, such as a cell phone. A label for case 3 may be associated with the same specific cell phone model X. Service system 550 may assign case 3 a higher label score 586 than case 2.

Service system 550 may use and weight any combination of scores 580-586 to generate overall case scores 588. For example, service system 550 may add weighted scores 580-586 for each case 500 to generate case scores 588. In one example, service system 550 then may use scores 588, instead of just similarity scores 580, in table 600 for adjusting ranking 590. Of course as previously mentioned, these are just examples of any factors that service system 550 may use for generating ranking 590 for articles 532.

Figure 6:
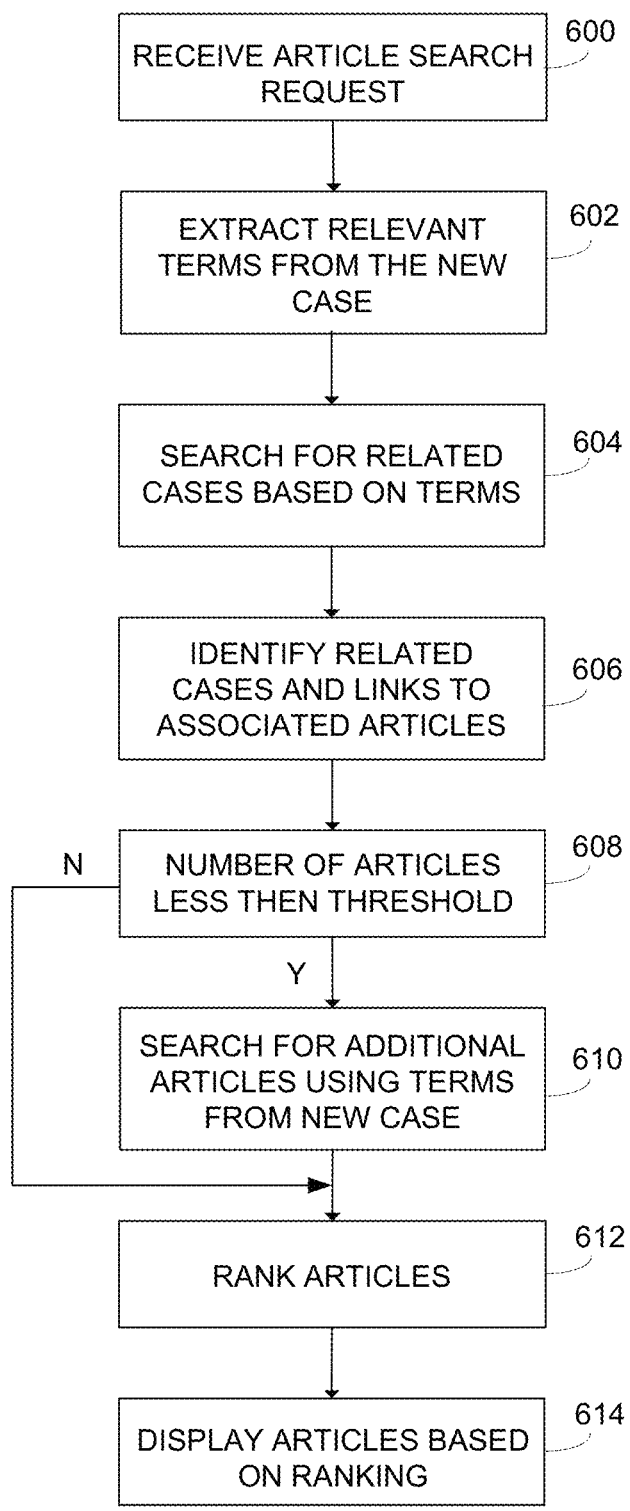
FIG. 6 shows an example process for identifying relevant articles according to some implementations.

FIG. 6 shows an example process for identifying articles according to some implementations. In operation 600, the database system receives a request to search for articles associated with a new case. For example, the agent or customer may select a search icon. In another example, the database system may automatically initiate the search as soon as the new case is created.

In operation 602, the database system may extract relevant terms from the new case. For example, the search engine may use an algorithm to identify most relevant terms in the title and/or description of the new case.

In operation 604, the database system searches for other cases related to the new case. For example, the search engine operating with the database system may search for other cases that include the same keywords as the new case. In one example, the search engine may search for cases that use similar text in the title. If the title is insufficient to find related cases, then the search engine may search for cases that use similar text from the description. Again, the search engine may not use all of the words from the title and/or description but may use a term identifier such as MLT to identify the most relevant terms.

In operation 606, the database system identifies related cases and the links to associated articles. For example, the database system may identify cases that include terms similar with those used in the new case. The database system then identifies any URLs in the identified cases that link to articles.

In operation 608, the database system identifies the number of articles linked to the related cases. For example, some cases may not include links to any articles and some cases may include multiple links to multiple articles. The database system may count the total number of articles linked to the related cases.

In operation 610, the database system searches for additional articles when the total number of articles identified in operation 608 is below a predetermined threshold. The second search may use the terms extracted from the new case to search directly for articles that include similar terms. The database system may skip operation 610 when the number of articles identified in operation 608 is above the threshold value.

In operation 612, the database system ranks the identified articles. For example, the database system may rank the articles based on any combination of the parameters described above in FIG. 5. In operation 612, the database system may cause the articles to be displayed based on the ranking. For example, the database system may display the highest ranked article first, followed by the second highest ranked article, etc.

Figure 7:
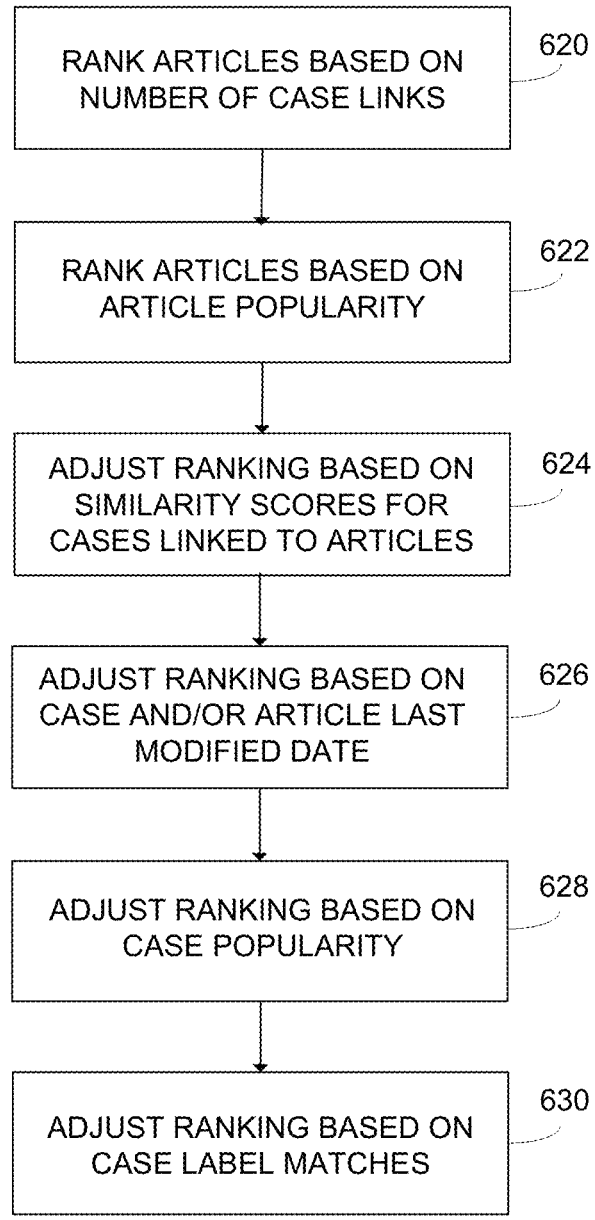
FIG. 7 shows an example process for ranking relevant articles according to some implementations.

FIG. 7 shows an example process for ranking articles according to some implementations. In operation 620, the database system may rank the identified articles based on the number of related cases linked to the articles.

In operation 622, the database system may adjust the ranking based on the popularity of the articles. For example, the database system may record likes, number of views, or any other user feedback that may indicate a level of helpfulness for the article. The database system may increase the ranking for popular articles and decrease the ranking for less popular articles.

In operation 624, the database system may adjust the ranking for articles based on the similarity scores for the cases linked to the articles. As explained above, the search engine may generate similarity scores for related cases based on the number and/or types of matching terms in the new case and the related case.

In operation 626, the database system may adjust the ranking based on the last modified date of the case and/or the last modified date of the article. For example, the database system may increase the ranking for an article linked to a case with a more recently modified date compared with an article linked to a case with a less recently modified date.

In operation 628, the database system may adjust the ranking based on the popularity of the cases associated with the articles. For example, the database system may increase the ranking for an article or related case with a large number of views, likes, etc. compared to a case with a smaller number of views or likes.

In operation 630, the database system may adjust the ranking for an article based on the label used in the associated case. As mentioned above, the user or agent may assign a label to a case. The search engine may assign different values to the case based on which entries in the taxonomy match the labels in the new case and the related case. Again, these are just example of some parameters that the database system may use for ranking the articles.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects. Additionally, while the disclosed examples are often described herein with reference to an implementation in which an on-demand database service environment is implemented in a system having an application server providing a front end for an on-demand database service capable of supporting multiple tenants, the present implementations are not limited to multi-tenant databases or deployment on application servers. Implementations may be practiced using other database architectures, i.e., ORACLE®, DB2® by IBM and the like without departing from the scope of the implementations claimed.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Additionally, any of the software components or functions described in this application can be implemented as software code to be executed by one or more processors using any suitable computer language such as, for example, Java, C++ or Perl using, for example, existing or object-oriented techniques. The software code can be stored as a computer- or processor-executable instructions or commands on a physical non-transitory computer-readable medium. Examples of suitable media include random access memory (RAM), read only memory (ROM), magnetic media such as a hard-drive or a floppy disk, or an optical medium such as a compact disk (CD) or DVD (digital versatile disk), flash memory, and the like, or any combination of such storage or transmission devices. Computer-readable media encoded with the software/program code may be packaged with a compatible device or provided separately from other devices (for example, via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While some implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A computer program stored on a non-transitory medium operating a search engine in a database system for identifying articles, the computer program comprising a set of instructions operable to:
   generate, by the database system, a new case containing content from a customer support query, the content comprising information related to the case;
   identify, by the database system, a description section in the new case, the description section describing the query;
   cause, by the database system, the term identifier algorithm to identify set of relevant terms at least in part from the description section in a search for a second case:
   search, by the database system, with the set of relevant terms for cases related to the new case, the cases containing other content from other customer support queries;
   generate, by the database system, scores for the related cases indicating levels of similarity of the content from the customer support query with the other content contained in the other customer support queries;
   identify, by the database system, articles linked to the related cases;
   determine, by the database system, whether a total number of articles linked to the related cases meet a predetermined threshold;
   initiate, by the database system, a supplemental search for additional articles when the total number of articles linked to the related cases is below the predetermined threshold;
   generate, by the database system, a ranking for the articles based on the scores for the related cases linked to the articles the scores for the related cases linked to articles based in part on a number of views of the related cases linked to articles; and
   cause, by the database system, the articles to be displayed on a remote user system in an order based on the ranking.

2. The computer program of claim 1, further comprising instructions operable to:
   cause, by the database system, extraction of a portion of the new case; and
   cause, by the database system, the portion of the new case to be used in the search for the related cases.

3. The computer program of claim 1, further comprising instructions operable to:
   extract, by the database system, a first set of terms from a title in the new case;
   extract, by the database system, a second set of terms from a description in the new case; and
   cause, by the database system, the first set of terms and the second set of terms to be used in the search for the related cases.

4. The computer program of claim 1, further comprising instructions operable to generate, by the database system, the ranking for the articles based on a number of the related cases linked to the articles.

5. The computer program of claim 1, further comprising instructions operable to:
   identify, by the database system, a label in a taxonomy;
   associate, by the database system, the label with the new case; and
   cause, by the database system, use of the label in the search for the related cases.

6. The computer program of claim 1, further comprising instructions operable to rank, by the database system, the articles based on last modified dates for the related cases linked to the articles.

7. The computer program of claim 1, wherein the supplemental search for additional articles comprises comparing terms in the new case with terms in the articles.

8. A method of a database system identifying articles, comprising:
   identifying a first case in the database system associated with an information query;
   receiving a request to identify an article for resolving the information query;
   identifying a description section in the first case, the description section describing the query;
   causing a term identifier algorithm to identify a set of relevant terms at least in part from the description section in a search for a second case related to a first case;
   causing a search engine to perform the search, with the set of relevant terms, for the second case in the database system related to the first case;
   identifying a link in the second case to an article indicated as helpful in resolving the second case;
   determining whether a total number of articles linked to the second case meets a predetermined threshold;
   initiating a supplemental search for additional articles when the total number of articles linked to the second case is below the predetermined threshold;

generating a score for the second case that indicates a similarity with the first case the score for the second case based in part on a number of views of the second case; and causing the display of the article on a remote user system in association with the first case.

9. The method of claim 8, further comprising:

identifying a title in the first case; and causing the term identifier algorithm to identify the set of relevant terms at least in part from the title in the search for the second case.

10. The method of claim 8, further comprising:

identifying a number of other cases related to the first case; and ranking the article based on a number of the other cases linked to the article.

11. The method of claim 8, further comprising:

ranking the article based on the score for the second case.

12. The method of claim 8, further comprising:

identifying a number of views of the second case;

identifying a number of views of the article; and ranking the article based on the number of views of the second case and the number of views of the article.

13. The method of claim 8, further comprising:

identifying a first label assigned to the first case;

identifying a second label assigned to the second case; and ranking the article based on a comparison of the first label with the second label.

14. A database system, comprising:

a processing system; and a memory device coupled to the processing system configured to operate a service system within the database system, the memory device having instructions stored thereon that, in response to execution by the processing system, are operable to:

identify through the service system a new case associated with an information query;

identify a description section in the new case, the description section describing the query;

cause the term identifier algorithm to identify the set of relevant terms at least in part from the description section in a search for other cases in the database system related to the new case;

cause by the service system a search engine to perform the search with the set of relevant terms for the other cases in the database system related to the new case;

generate scores for the related cases indicating levels of similarity of content in the new case with content in the related cases, content comprising information related to each respective case;

identify by the service system articles indicated as resolving the related cases;

determine whether a total number of articles linked to the related cases meet a predetermined threshold;

initiate by the service system a supplemental search for additional articles when the total number of articles linked to the related cases is below the predetermined threshold;

ranking the articles based on the scores for the related cases the scores for the related cases linked to articles based in part on a number of views of the related cases linked to articles; and causing by the service system the articles associated with the related cases to be displayed with the new case based on the ranking of the articles.

15. The database system of claim 14, wherein the instructions are further operable to:

extract by the term identifier algorithm text from a title and description in the new case; and submit by the service system the text to the search engine for performing the search.

16. The database system of claim 15, wherein the instructions are further operable to:

generate by the service system the ranking of the articles based on a number of the related cases linked to the articles; and display the articles in an ordered list based on the ranking.

17. The database system of claim 16, wherein the instructions are further operable to:

identify by the service system a number of the articles associated with the related cases;

cause by the service system the search engine to perform an additional search for additional articles containing terms extracted from the new case; and causing the additional articles to be displayed with the articles associated with the related cases.

* * * * *